United States Patent
Quinn et al.

(10) Patent No.: US 10,687,538 B1
(45) Date of Patent: Jun. 23, 2020

(54) ANIMAL TENDERIZING CHAIN AND WEIGHT

(71) Applicant: Bonnie Joyce One Road, Peever, SD (US)

(72) Inventors: Alvah Quinn; Bonnie Joyce One Road, Peever, SD (US)

( * ) Notice: Subject to any disclaimer, the term of this patent is extended or adjusted under 35 U.S.C. 154(b) by 0 days.

(21) Appl. No.: 16/423,267

(22) Filed: May 28, 2019

(51) Int. Cl.
*A22C 9/00* (2006.01)
*A22C 15/00* (2006.01)

(52) U.S. Cl.
CPC ............. *A22C 9/00* (2013.01); *A22C 15/00* (2013.01)

(58) Field of Classification Search
CPC ......... A22C 9/00; A22C 15/00; A22C 15/001; A22C 15/003
USPC ................................................ 452/141–147
See application file for complete search history.

(56) References Cited

U.S. PATENT DOCUMENTS

| | | | |
|---|---|---|---|
| 2,544,681 A | 3/1951 | Albert | |
| 3,579,716 A | 5/1971 | Stouffer | |
| 4,358,872 A | 11/1982 | VanZandt | |
| 5,588,940 A * | 12/1996 | Price | A63B 21/065 224/259 |
| 5,836,812 A * | 11/1998 | Brackett | A01M 31/006 452/187 |
| 5,839,999 A * | 11/1998 | Pflugner | A63B 21/023 482/140 |
| 6,988,944 B1 | 1/2006 | Syers | |
| 7,059,956 B1 | 6/2006 | Summerlin | |
| 7,264,544 B2 * | 9/2007 | Tokarski | A22B 5/06 452/198 |
| 7,338,356 B2 | 3/2008 | Bell | |
| 7,374,388 B2 * | 5/2008 | Holt | B60P 1/5471 212/180 |
| 7,387,566 B2 * | 6/2008 | Dunagan | A22B 5/06 452/102 |
| 7,584,940 B2 * | 9/2009 | Gee | A01M 31/02 182/135 |
| D636,036 S | 4/2011 | Rios | |
| 8,545,294 B1 * | 10/2013 | Stevens | A22B 5/06 452/120 |
| 8,777,703 B1 * | 7/2014 | Herron | A22B 5/161 452/128 |
| 2010/0323852 A1 * | 12/2010 | Locsin | A63B 1/00 482/96 |
| 2014/0274593 A1 * | 9/2014 | Kelly | A63B 21/0004 482/105 |

FOREIGN PATENT DOCUMENTS

WO 2007053856 5/2007

* cited by examiner

Primary Examiner — Richard T Price, Jr.

(57) ABSTRACT

The animal tenderizing chain and weight is configured for use with a carcass. The carcass is selected from the group consisting of livestock and a game animal. The animal tenderizing chain and weight is configured for use in the post-slaughter processing of the carcass into meat. The animal tenderizing chain and weight applies a tension to the carcass that damages the connective tissues within the muscles of the carcass in a manner that accelerates the tenderization of the meat produced from the carcass. The animal tenderizing chain and weight is a kit that comprises a plurality of chains, a plurality of weights, and a plurality of S-hooks. The plurality of chains, a plurality of weights, and a plurality of S-hooks attach to the plurality of fore appendages when the carcass is suspended from the plurality of hind appendages.

12 Claims, 3 Drawing Sheets

ANIMAL TENDERIZING CHAIN AND WEIGHT

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of foodstuffs including processing meat, more specifically, an apparatus for tenderizing meat. (A22C9/00)

SUMMARY OF INVENTION

The animal tenderizing chain and weight is configured for use with a carcass. The carcass is selected from the group consisting of livestock and a game animal. The carcass is further defined with a plurality of fore appendages and a plurality of hind appendages. The animal tenderizing chain and weight is configured for use in the post-slaughter processing of the carcass into meat. The animal tenderizing chain and weight applies a tension to the carcass that damages the connective tissues within the muscles of the carcass in a manner that accelerates the tenderization of the meat produced from the carcass. The animal tenderizing chain and weight is a kit that comprises a plurality of chains, a plurality of weights, and a plurality of S-hooks. The plurality of chains, a plurality of weights, and a plurality of S-hooks attach to the plurality of fore appendages when the carcass is suspended from the plurality of hind appendages.

These together with additional objects, features and advantages of the animal tenderizing chain and weight will be readily apparent to those of ordinary skill in the art upon reading the following detailed description of the presently preferred, but nonetheless illustrative, embodiments when taken in conjunction with the accompanying drawings.

In this respect, before explaining the current embodiments of the animal tenderizing chain and weight in detail, it is to be understood that the animal tenderizing chain and weight is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the animal tenderizing chain and weight.

It is therefore important that the claims be regarded as including such equivalent construction insofar as they do not depart from the spirit and scope of the animal tenderizing chain and weight. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
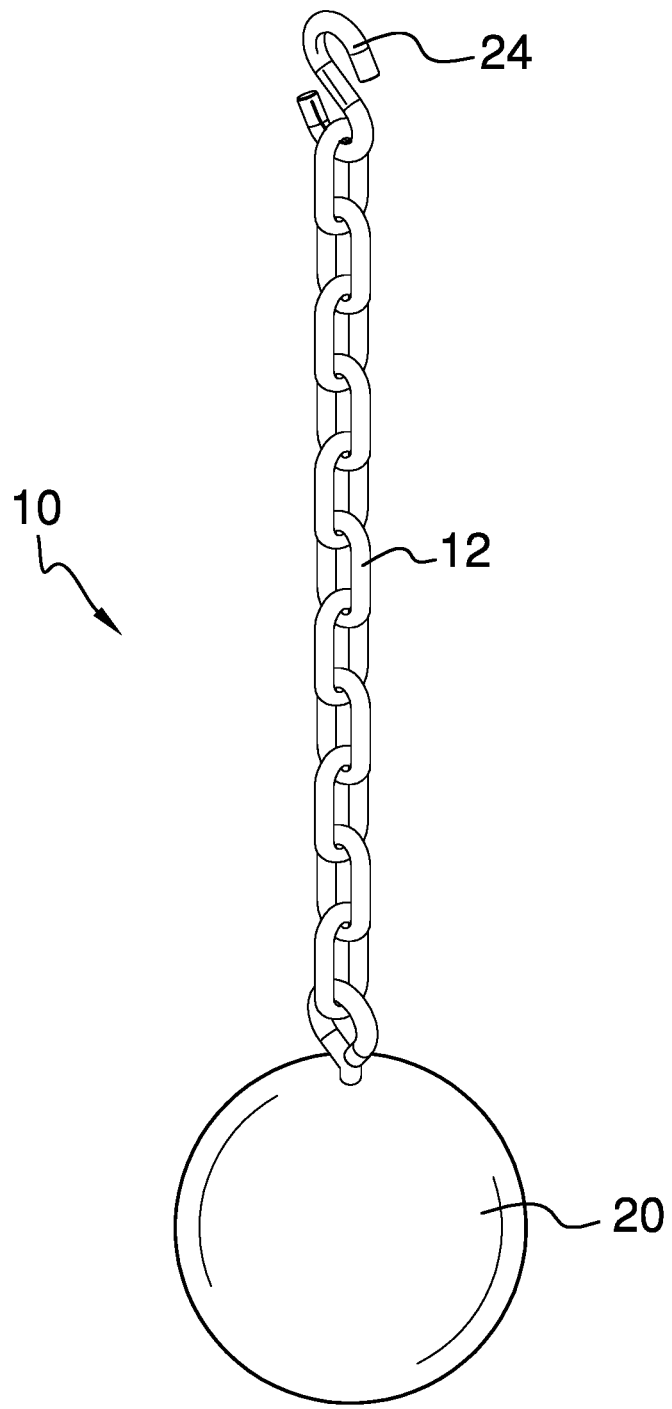
FIG. 1 is a perspective view of an embodiment of the disclosure.
Figure 2:
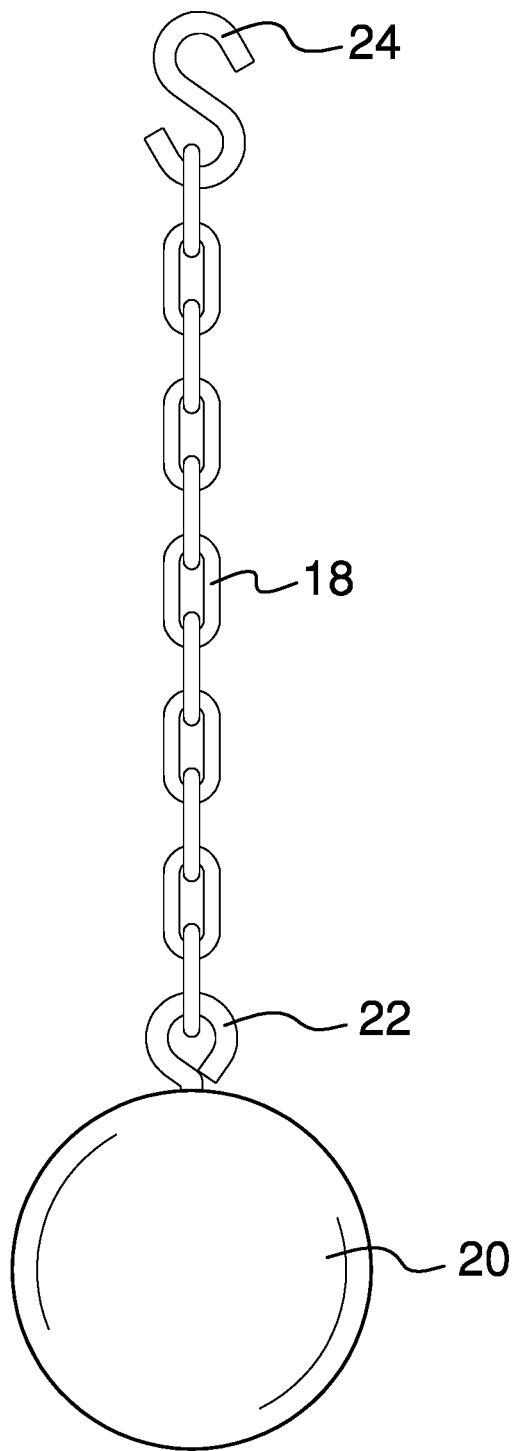
FIG. 2 is a front view of an embodiment of the disclosure.
Figure 3:
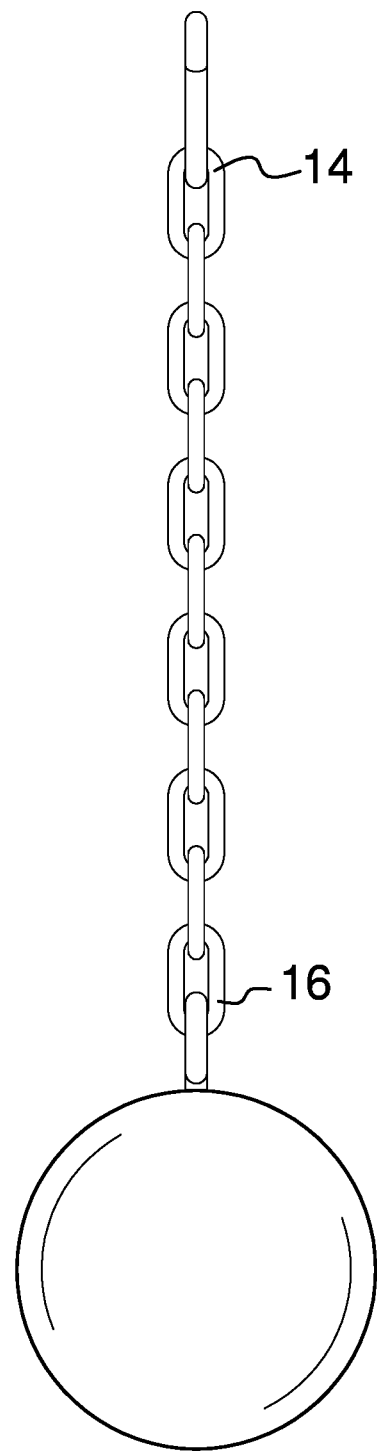
FIG. 3 is a side view of an embodiment of the disclosure.
Figure 4:
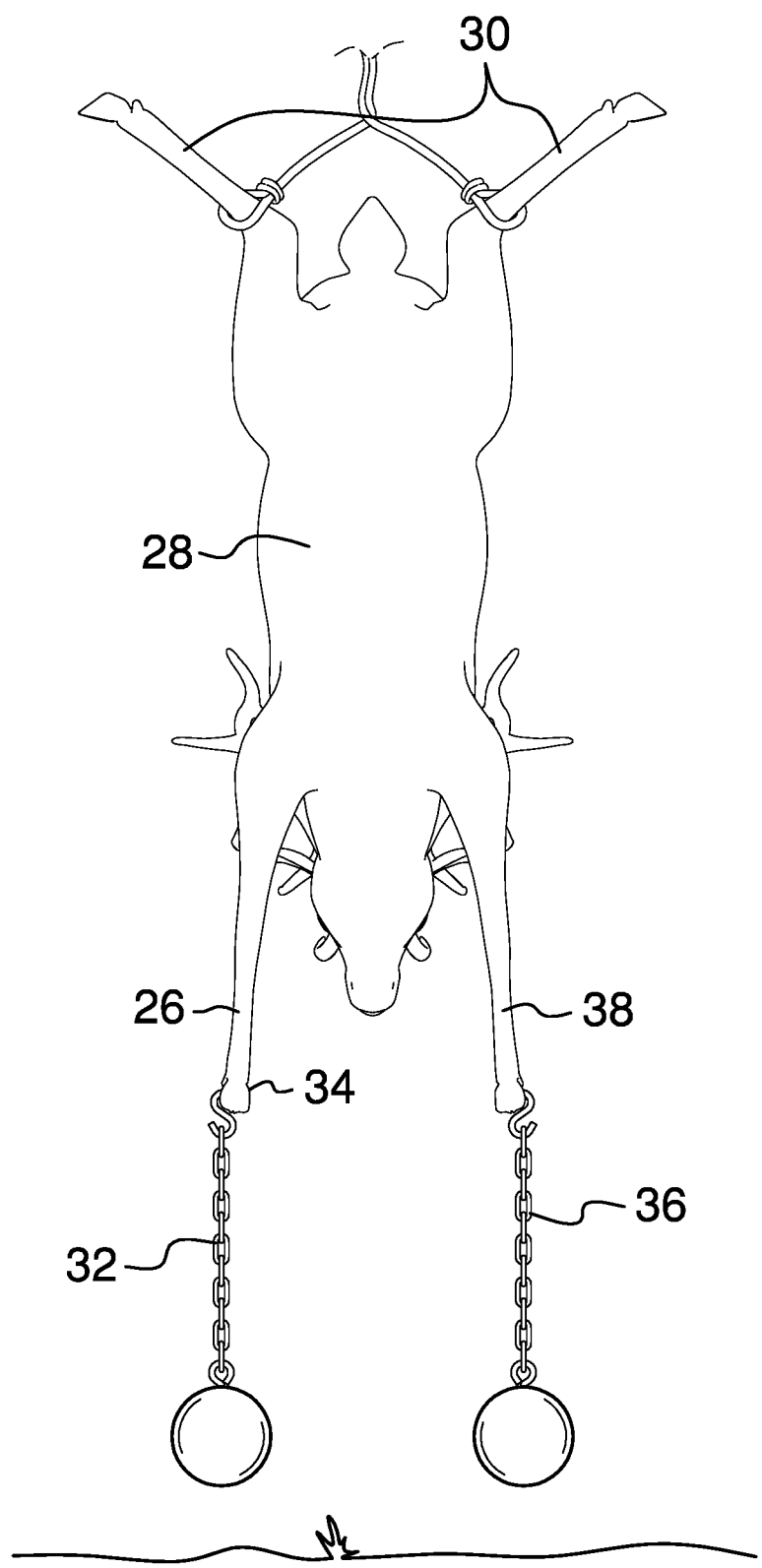
FIG. 4 is an in-use view of an embodiment of the disclosure.

Detailed reference will now be made to one or more potential embodiments of the disclosure, which are illustrated in FIGS. 1 through 4.

The animal tenderizing chain and weight 100 (hereinafter invention) is configured for use with a carcass 104. The carcass 104 is selected from the group consisting of livestock and a game animal. The carcass 104 is further defined with a plurality of fore appendages 141 and a plurality of hind appendages 142. The invention 100 is configured for use in the post-slaughter processing of the carcass 104 into meat. The invention 100 applies a tension to the carcass 104 that damages the connective tissues within the muscles of the carcass 104 in a manner that accelerates the tenderization of the meat produced from the carcass 104.

The plurality of hind appendages 142 comprises the two limbs of the carcass 104 that are distal from the head of the carcass 104. During the post-slaughter processing of the carcass 104, the carcass 104 is suspended above a supporting surface by the plurality of hind appendages 142.

The plurality of fore appendages 141 comprises the two limbs of the carcass 104 that are proximal to the head of the carcass 104. The plurality of fore appendages 141 comprises a first fore appendage 151 and a second fore appendage 152. The first fore appendage 151 is a limb selected from the plurality of fore appendages 141 that hangs freely from the carcass 104 during the post-slaughter processing of the carcass 104. The second fore appendage 152 is a limb selected from the plurality of fore appendages 141 that hangs freely from the carcass 104 during the post-slaughter processing of the carcass 104.

The invention 100 is a kit that comprises a plurality of chains 101, a plurality of weights 102, and a plurality of S-hooks 103. The plurality of chains 101, a plurality of weights 102, and a plurality of S-hooks 103 attach to the plurality of fore appendages 141 when the carcass 104 is suspended from the plurality of hind appendages 142.

Each of the plurality of chains 101 is a linear series of interlinked rings. Each of the plurality of chains 101 performs in the manner of a cord. Each of the plurality of chains 101 has a tensile strength but does not have a compressive strength. Each of the plurality of chains 101 is an extension structure that suspends a weight selected from the plurality of weights 102 to a fore appendage selected from the plurality of fore appendages 141. The span of the length of each of the plurality of chains 101 extends the reach between the selected weight and the selected fore appendage such that the selected weight will not damage the selected fore appendage during the post-slaughter processing of the carcass 104. The plurality of chains 101 comprises a first chain 111 and a second chain 112.

The first chain 111 is a load-bearing structure selected from the plurality of chains 101. The first chain 111 forms the load path between the first weight 121 of the plurality of weights 102 and the first fore appendage 151 of the plurality of fore appendages 141.

The second chain 112 is a load-bearing structure selected from the plurality of chains 101. The second chain 112 forms the load path between the second weight 122 of the plurality of weights 102 and the second fore appendage 152 of the plurality of fore appendages 141.

Each of the plurality of weights 102 is a structure that is formed with an associated weight. Each of the plurality of weights 102 is suspended from a fore appendage selected from the plurality of fore appendages 141 by the plurality of chains 101 and the plurality of S-hooks 103. Each of the plurality of weights 102 applies a load to the selected fore appendage such that the selected fore appendage forms a link in the load path of the selected weight. The connective muscle tissues within the carcass 104 bear a significant portion of the load presented to the carcass 104 by the plurality of weights 102. The action of the plurality of weights 102 causes the connective muscle tissues to break down thereby accelerating the tenderization of the meat of the carcass 104. The plurality of weights 102 comprises a first weight 121 and a second weight 122. The first weight 121 further comprises a first anchor ring 161. The second weight 122 further comprises a second anchor ring 162.

The first weight 121 is the mass carrying structure selected from the plurality of weights 102. The first weight 121 is the structure that applies the force to the carcass 104 that breaks up the connective muscle tissue through the carcass 104. The first weight 121 is suspended from the first fore appendage 151 by the first chain 111. The first anchor ring 161 is a loop structure attached to the first weight 121. The first anchor ring 161 forms an anchor point to which the second S-hook 132 attaches.

The second weight 122 is the mass carrying structure selected from the plurality of weights 102. The second weight is the structure that applies the force to the carcass 104 that breaks up the connective muscle tissue through the carcass 104. The second weight 122 is suspended from the second fore appendage 152 by the second chain 112. The second anchor ring 162 is a loop structure attached to the second weight 122. The second anchor ring 162 forms an anchor point to which the fourth S-hook 134 attaches.

Each of the plurality of S-hooks 103 is a fastening device. The use of an S-hook is well-known and documented in the mechanical arts. Each of the plurality of S-hooks 103 is an S-hook that performs a fastening function selected from the group consisting of: a) attaching a chain selected from the plurality of chains 101 to a weight selected from the plurality of weights 102; and, b) attaching a chain selected from the plurality of chains 101 to a fore appendage selected from the plurality of fore appendages 141. The plurality of S-hooks 103 comprises a first S-hook 131, a second S-hook 132, a third S-hook 133, and a fourth S-hook 134.

The first S-hook 131 is a commercially available S-hook selected from the plurality of S-hooks 103. The first S-hook 131 secures the first chain 111 to itself after the first chain 111 is bound to the first fore appendage 151 of the plurality of fore appendages 141.

The second S-hook 132 is a commercially available S-hook selected from the plurality of S-hooks 103. The second S-hook 132 secures the first chain 111 to the first anchor ring 161 of the first weight 121 such that the first weight 121 is suspended from the first fore appendage 151.

The third S-hook 133 is a commercially available S-hook selected from the plurality of S-hooks 103. The third S-hook 133 secures the second chain 112 to itself after the second chain 112 is bound to the second fore appendage 152 of the plurality of fore appendages 141. T The fourth S-hook 134 is a commercially available S-hook selected from the plurality of S-hooks 103. The fourth S-hook 134 secures the second chain 112 to second anchor ring 162 of the second weight 122 such that the second weight 122 is suspended from the second fore appendage 152.

The following definitions were used in this disclosure:

Anchor: As used in this disclosure, anchor means to hold an object firmly or securely.

Anchor Point: As used in this disclosure, an anchor point is a location to which a first object can be securely attached to a second object.

And/Or: As used in this disclosure, the term and/or is a grammatical conjunction that implies the logical function known as the inclusive or. Specifically, the term and/or implies that at least one and potentially more than one of the plurality of statements joined by the and/or conjunction will be true.

Appendage: As used in this disclosure, appendage is a generic term used to describe either the arm and/or leg of a patient.

Atom: As used in this disclosure, an atom is the smallest single unit of an element.

Bind: As used in this disclosure, to bind is a verb that means to tie or secure a first object to a second object using a strap, cord or webbing.

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or a prism. The center axis of a prism is the line that joins the center point of the first congruent face of the prism to the center point of the second corresponding congruent face of the prism. The center axis of a pyramid refers to a line formed through the apex of the pyramid that is perpendicular to the base of the pyramid. When the center axes of two cylinder, prism or pyramidal structures share the same line they are said to be aligned.

When the center axes of two cylinder, prism or pyramidal structures do not share the same line they are said to be offset.

Chain: As used in this disclosure, a chain is a series of interlinked rings that form a cord-like structure. Like a cord, a chain has tensile strength but is too flexible to provide compressive strength and is not suitable for use in pushing objects. The rings to form a chain are often formed from a metal.

Cord: As used in this disclosure, a cord is a long, thin, flexible, and prism-shaped string, line, rope, or wire. Cords are made from yarns, piles, or strands of material that are braided or twisted together or from a monofilament (such as fishing line). Cords have tensile strength but are too flexible to provide compressive strength and are not suitable for use in pushing objects. String, line, cable, and rope are synonyms for cord.

Extension Structure: As used in this disclosure, an extension structure is an inert physical structure that is used to extend or bridge the reach between any two objects.

Game Animal: As used in this disclosure, a game animal is an animal that is targeted by a hunter during hunting activities.

Hang: As used in this disclosure, to hang an object is to suspend an object above a surface from above such that the inferior end of the object does not form a significant portion of the load path of the object.

Hook: As used in this disclosure, a hook is an object that is curved or bent at an angle such that items can be hung on or caught by the object.

Hunt: As used in this disclosure, to hunt means to pursue and kill an animal for sport, food, or animal control purposes.

Livestock: As used in this disclosure, livestock refers to one or more animals that are maintained as the property of an agricultural operation.

Load: As used in this disclosure, the term load refers to an object upon which a force is acting or which is otherwise absorbing energy in some fashion. Examples of a load in this sense include, but are not limited to, a mass that is being moved a distance or an electrical circuit element that draws energy. The term load is also commonly used to refer to the forces that are applied to a stationary structure.

Load Path: As used in this disclosure, a load path refers to a chain of one or more structures that transfers a load generated by a raised structure or object to a foundation, supporting surface, or the earth.

Loop: As used in this disclosure, a loop is the length of a first linear structure including, but not limited to, shafts, lines, cords, or ribbons, that is: 1) folded over and joined at the ends forming an enclosed space; or, 2) curved to form a closed or nearly closed space within the first linear structure. In both cases, the space formed within the first linear structure is such that a second linear structure such as a line, cord or a hook can be inserted through the space formed within the first linear structure. Within this disclosure, the first linear structure is said to be looped around the second linear structure.

Mass: As used in this disclosure, refers to a quantity of matter within a structure. Mass is measured and quantified by the reaction of the structure to a force. Mass can also be roughly quantified as a function of atomic composition and the number of atoms contained within the structure. The term weight refers to quantification of a mass that is exposed to the force of gravity.

Non-Euclidean Prism: As used in this disclosure, a non-Euclidean prism is a prism structure wherein the center axis of the prism lies on a non-Euclidean plane.

Not Significantly Different: As used in this disclosure, the term not significantly different compares a specified property of a first object to the corresponding property of a reference object (reference property). The specified property is considered to be not significantly different from the reference property when the absolute value of the difference between the specified property and the reference property is less than 10.0% of the reference property value. A negligible difference is considered to be not significantly different.

Patient: As used in this disclosure, a patient is a person who is designated to receive a treatment, therapy or service. The term patient may be extended to an animal when used within the context of the animal receiving veterinary treatment or services.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Reach: As used in this disclosure, reach refers to a span of distance between any two objects.

Ring: As used in this disclosure, a ring is term that is used to describe a disk-like structure through which an aperture is formed. Rings are often considered loops.

Roughly: As used in this disclosure, roughly refers to a comparison between two objects. Roughly means that the difference between one or more parameters of the two compared are not significantly different.

S-Hook: As used in this disclosure, the S-hook is a non-Euclidean prism structure that has the shape of the letter S. The S-hook is a fastening device that attaches a first object to a second object. Specifically, the S-hook hangs from the first object such that the second object may be suspended from the first object. The S-hook is a well-known and commercially available structure.

Suspend: As used in this disclosure, to suspend an object means to support an object such that the inferior end of the object does not form a significant portion of the load path of the object. Include inferior superior and load path.

With respect to the above description, it is to be realized that the optimum dimensional relationship for the various components of the invention described above and in FIGS. 1 through 4 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A kit for tenderizing the meat of a carcass comprising a plurality of chains, a plurality of weights, and a plurality of S-hooks;
wherein the kit for tenderizing the meat of a carcass is configured for use with a carcass;
wherein the carcass is selected from the group consisting of livestock and a game animal;
wherein the carcass is further defined with a plurality of fore appendages and a plurality of hind appendages;
wherein the plurality of chains, a plurality of weights, and a plurality of S-hooks attach to the plurality of fore appendages;
wherein the kit for tenderizing the meat of a carcass is configured for use in the post-slaughter processing of the carcass into meat;
wherein the kit for tenderizing the meat of a carcass applies a tension to the carcass that damages the connective tissues within the muscles of the carcass;
wherein the plurality of fore appendages comprises a first fore appendage and a second fore appendage;
wherein the first fore appendage is a limb selected from the plurality of fore appendages that hangs freely from the carcass during the post-slaughter processing of the carcass;
wherein the second fore appendage is a limb selected from the plurality of fore appendages that hangs freely from the carcass during the post-slaughter processing of the carcass;
wherein the plurality of chains, a plurality of weights, and a plurality of S-hooks attach to the plurality of fore appendages when the carcass is suspended from the plurality of hind appendages;
wherein each of the plurality of chains is a linear series of interlinked rings;
wherein each of the plurality of chains is an extension structure that suspends a weight selected from the plurality of weights to a fore appendage selected from the plurality of fore appendages;
wherein the span of the length of each of the plurality of chains extends the reach between the selected weight and the selected fore appendage such that the selected weight will not damage the selected fore appendage during the post-slaughter processing of the carcass;
wherein each of the plurality of weights is a mass containing structure that is formed with an associated weight;
wherein each of the plurality of weights is suspended from a fore appendage selected from the plurality of fore appendages by the plurality of chains and the plurality of S-hooks;
wherein each of the plurality of weights applies a load to the selected fore appendage such that the selected fore appendage forms a link in the load path of the selected weight.

2. The kit for tenderizing the meat of a carcass according to claim 1 wherein each of the plurality of S-hooks is a fastening device.

3. The kit for tenderizing the meat of a carcass according to claim 2 wherein each of the plurality of S-hooks is an S-hook that performs a fastening function selected from the group consisting of: a) attaching a chain selected from the plurality of chains to a weight selected from the plurality of weights;
and, b) attaching a chain selected from the plurality of chains to a fore appendage selected from the plurality of fore appendages.

4. The kit for tenderizing the meat of a carcass according to claim 3
wherein the plurality of chains comprises a first chain and a second chain;
wherein the first chain is a load-bearing structure selected from the plurality of chains;
wherein the second chain is a load-bearing structure selected from the plurality of chains.

5. The kit for tenderizing the meat of a carcass according to claim 4
wherein the first chain forms the load path between the first weight of the plurality of weights and the first fore appendage of the plurality of fore appendages;
wherein the second chain forms the load path between the second weight of the plurality of weights and the second fore appendage of the plurality of fore appendages.

6. The kit for tenderizing the meat of a carcass according to claim 5
wherein the plurality of weights comprises a first weight and a second weight;
wherein the first weight is a mass carrying structure selected from the plurality of weights;
wherein the second weight is a mass carrying structure selected from the plurality of weights.

7. The kit for tenderizing the meat of a carcass according to claim 6
wherein the first weight is suspended from the first fore appendage by the first chain;
wherein the second weight is suspended from the second fore appendage by the second chain.

8. The kit for tenderizing the meat of a carcass according to claim 7
wherein the plurality of S-hooks comprises a first S-hook, a second S-hook, a third S-hook, and a fourth S-hook;
wherein the first S-hook attaches to the first chain;
wherein the second S-hook attaches to the first chain;
wherein the third S-hook attaches to the second chain;
wherein the fourth S-hook attaches to the second chain.

9. The kit for tenderizing the meat of a carcass according to claim 8
wherein the first weight further comprises a first anchor ring;
wherein the second weight further comprises a second anchor ring;
wherein the first anchor ring is a loop structure attached to the first weight;
wherein the second anchor ring is a loop structure attached to the second weight.

10. The kit for tenderizing the meat of a carcass according to claim 9
wherein the first anchor ring forms an anchor point to which the second S-hook attaches;
wherein the second anchor ring forms an anchor point to which the fourth S-hook attaches.

11. The kit for tenderizing the meat of a carcass according to claim 10
wherein the first S-hook secures the first chain to itself after the first chain is bound to the first fore appendage of the plurality of fore appendages;

wherein the third S-hook secures the second chain to itself after the second chain is bound to the second fore appendage of the plurality of fore appendages.

12. The kit for tenderizing the meat of a carcass according to claim 11
wherein the second S-hook secures the first chain to the first anchor ring of the first weight such that the first weight is suspended from the first fore appendage;
wherein the fourth S-hook secures the second chain to the second anchor ring of the second weight such that the second weight is suspended from the second fore appendage.

\* \* \* \* \*